(12) United States Patent
Streppel et al.

(10) Patent No.: US 9,632,214 B2
(45) Date of Patent: Apr. 25, 2017

(54) OPTICAL ELEMENT AND RADIATION-EMITTING DEVICE COMPRISING SUCH AN OPTICAL ELEMENT

(75) Inventors: Ulrich Streppel, Regensburg (DE); Ales Markytan, Regensburg (DE); Christian Gaertner, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 13/978,132

(22) PCT Filed: Jan. 27, 2012

(86) PCT No.: PCT/EP2012/051378
§ 371 (c)(1),
(2), (4) Date: Sep. 19, 2013

(87) PCT Pub. No.: WO2012/130495
PCT Pub. Date: Oct. 4, 2012

(65) Prior Publication Data
US 2014/0001507 A1    Jan. 2, 2014

(30) Foreign Application Priority Data
Mar. 29, 2011 (DE) ........................ 10 2011 015 405

(51) Int. Cl.
*G02B 3/00* (2006.01)
*F21V 5/00* (2015.01)
*F21V 5/04* (2006.01)
*G02B 3/08* (2006.01)
*F21Y 101/00* (2016.01)
(Continued)

(52) U.S. Cl.
CPC ............ *G02B 3/0006* (2013.01); *F21V 5/002* (2013.01); *F21V 5/005* (2013.01); *F21V 5/04* (2013.01); *F21V 5/045* (2013.01); *G02B 3/08* (2013.01); *F21Y 2101/00* (2013.01); *F21Y 2105/10* (2016.08); *F21Y 2115/10* (2016.08)

(58) Field of Classification Search
CPC .................................. F21V 5/046; G02B 3/08
USPC ................. 362/311.09, 311.06, 311.01, 338; 359/743, 619–628
See application file for complete search history.

(56) References Cited

U.S. PATENT DOCUMENTS 2,246,098 A    6/1941  Jaeckel
3,425,056 A *  1/1969  Dawson ................... F21V 5/00
                                                  340/815.76
5,103,383 A *  4/1992  Mayhew ....................... 362/186
(Continued)

FOREIGN PATENT DOCUMENTS

DE       68902991 T2    4/1993
DE       19542416 A1    5/1996
(Continued)

*Primary Examiner* — Jong-Suk (James) Lee
*Assistant Examiner* — Christopher E Dunay
(74) *Attorney, Agent, or Firm* — Slater Matsil, LLP

(57) ABSTRACT

An optical element has an optical body and a number of microstructures. The optical body takes the form of a half-shell and has an inner face and an outer face. The microstructures form the inner and/or outer face of the optical body at least in places and are light-scattering refractive structures. The invention further relates to a radiation-emitting device having at least one semiconductor component and one such optical element.

12 Claims, 7 Drawing Sheets

(51) Int. Cl.
    *F21Y 105/10*      (2016.01)
    *F21Y 115/10*      (2016.01)

(56) References Cited

U.S. PATENT DOCUMENTS

| | | | |
|---|---|---|---|
| 6,264,347 | B1 | 7/2001 | Godbillon et al. |
| 6,328,456 | B1 * | 12/2001 | Mize ........................ 362/311.02 |
| 6,469,241 | B1 * | 10/2002 | Penn ........................ F24J 2/085 |
| | | | 126/683 |
| 6,755,556 | B2 | 6/2004 | Gasquet et al. |
| 6,908,219 | B1 * | 6/2005 | Reiss ........................... 362/338 |
| 7,123,419 | B1 | 10/2006 | Simon |
| 7,201,503 | B2 | 4/2007 | Amano et al. |
| 7,251,084 | B2 | 7/2007 | Shimura |
| 7,293,889 | B2 * | 11/2007 | Kamiya et al. ................ 362/84 |
| 7,794,127 | B2 * | 9/2010 | Huang et al. ................ 362/522 |
| 7,866,855 | B2 * | 1/2011 | Abdelsamed ................ 362/338 |
| 8,253,154 | B2 | 8/2012 | Jung et al. |
| 2003/0156417 | A1 | 8/2003 | Gasquet et al. |
| 2005/0190564 | A1 * | 9/2005 | Amano et al. ................ 362/336 |
| 2010/0290234 | A1 * | 11/2010 | Bierhuizen et al. ..... 362/311.02 |
| 2011/0216543 | A1 * | 9/2011 | Kayanuma ............... 362/311.01 |

FOREIGN PATENT DOCUMENTS

| | | | |
|---|---|---|---|
| EP | 2110689 | A1 | 10/2009 |
| GB | 778438 | A | 7/1957 |
| GB | 2332638 | A | 6/1999 |
| JP | 71805 | Y2 | 1/1995 |
| JP | 200549367 | A | 2/2005 |
| JP | 2005243456 | A | 9/2005 |
| KR | 1020070070291 | A | 7/2007 |
| KR | 100998017 | B1 | 12/2010 |
| TW | 200944696 | A | 11/2009 |

\* cited by examiner

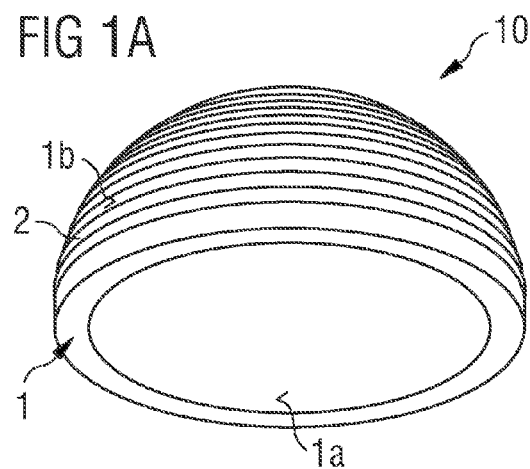
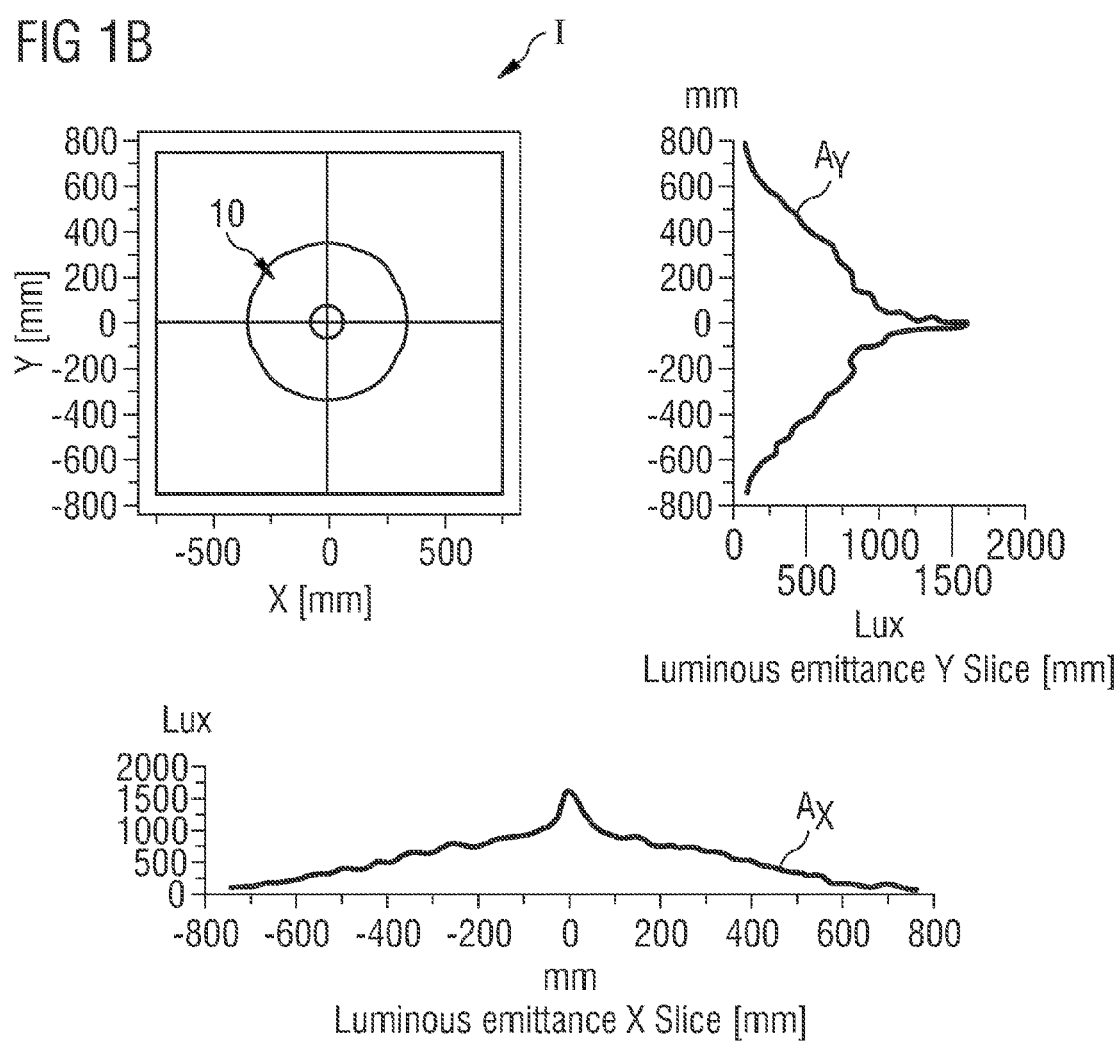

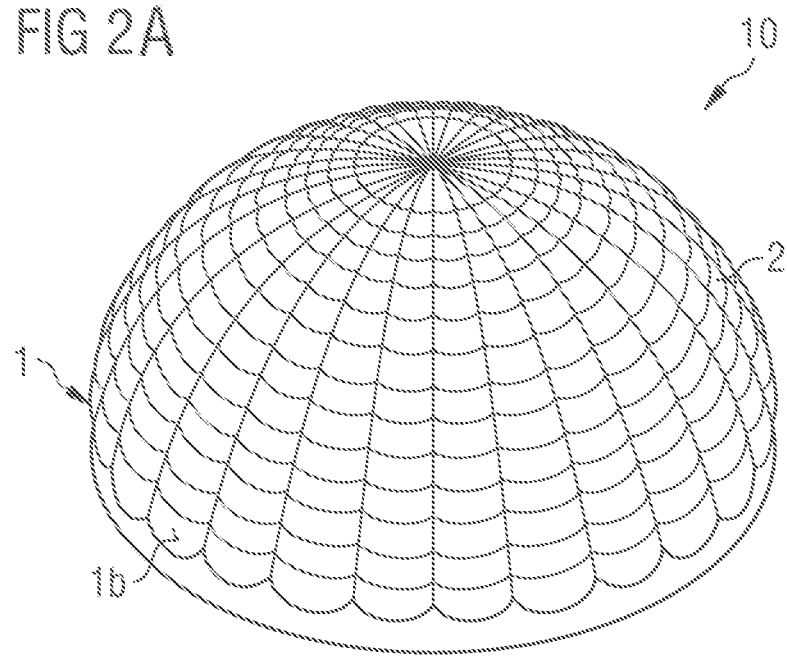

OPTICAL ELEMENT AND RADIATION-EMITTING DEVICE COMPRISING SUCH AN OPTICAL ELEMENT

This patent application is a national phase filing under section 371 of PCT/EP2012/051378, filed Jan. 27, 2012, which claims the priority of German patent application 10 2011 015 405.1, filed Mar. 29, 2011, each of which is incorporated herein by reference in its entirety.

TECHNICAL FIELD

The invention relates to an optical element comprising an optical body and a plurality of microstructures and to a radiation-emitting device having a semiconductor component and such an optical element.

BACKGROUND

If radiation-emitting devices of high brightness are to be produced, it is necessary to use more than one radiation-emitting component in order to achieve the required brightness. One option in these applications is, for example, to use an arrangement of a plurality of LEDs mounted side by side. If an optical system is used to shape the light emitted by the LEDs, one consequence of using the plurality of LEDs spatially separated from one another is inter alia that the focused beams emitted by the optical system are split, and halo-like shadows are cast due to the aperture of the optical system which, depending on the respective position of the LEDs, divides the emitted beam of light into different spatial regions. The disadvantageous consequence is non-homogeneous illumination.

In order to counter this problem, it is known to mount light-scattering elements, for example, elements containing diffusers or elements with elevated surface roughness, behind the LEDs. Disadvantageously, however, this results in large losses, since a large proportion of the light emitted by the LED is scattered back in a backwards direction and is thus for the most part lost to the intended application.

It is furthermore known to mount elements with variable transmission behind the optical system. However, this is likewise disadvantageous since this method is based on shading the emitted beam of light, so reducing efficiency. Moreover, this method does only solve the problem of shadows being cast. In addition, elevated assembly costs are involved.

SUMMARY OF THE INVENTION

In one aspect, the present application provides an optical element which avoids the above-stated disadvantages, whereby an optical element is advantageously obtained which enables homogeneous illumination. In a further aspect, the present application provides a radiation-emitting device having such an optical element, in which the device is distinguished by particularly homogeneous emission efficiency across the emission angle.

In an embodiment, the optical element comprises an optical body and a plurality of microstructures, wherein the optical body takes the form of a half-shell and comprises an inner face and an outer face. The microstructures form the inner and/or outer face of the optical body at least in places. The microstructures are light-scattering refractive structures.

According to at least one embodiment, the optical element is designed to allow passage of light. In other words, the action of the optical element involves transmission and not reflection. The optical element thus takes the form of a lens and not of a mirror.

The optical element is thus distinguished by refractive structures which advantageously exhibit merely Fresnel losses and avoid the disadvantageous backscattering of conventional scattering elements. These refractive structures are mounted on the half-shell or form the face thereof. These microstructures may here be mounted on the inner and outer faces of the half-shell or on only one of these faces. Thanks to the microstructures, the emission pattern is homogenized in the direction of the curvature of the refractive structures.

Very high emission efficiency can be achieved with such an optical element as substantially only Fresnel losses occur. In addition, the problem of light mixing and of shadows being cast is simultaneously solved. Any further optical systems optionally arranged downstream may here be of substantially simpler design. Moreover, the microstructures may be configured such that they are already suitable for radiation shaping.

The optical element is preferably radiation-transmissive. In particular, the optical element is at least partially transparent in the UV wavelength range and/or in the visible wavelength range.

For the purposes of the application, a half-shell is a three-dimensional body which takes the form of a half-shell. For example, the half-shell is a hollow hemisphere.

The optical element, in particular the optical body and the microstructures, are preferably of one-piece construction, i.e., produced in a single piece. The optical element is, for example, produced by means of a casting method, for example, by an injection molding or transfer molding method. The microstructures are thus not applied to the inner and/or outer face of the half-shell, but instead themselves form said face.

The microstructures are refractive structures, which advantageously do not operate with roughness or diffusers. Refractive structures are distinguished in that light is refracted on them in accordance with the law of refraction. Backscattering is here advantageously avoided, such that overall outcoupling efficiency is advantageously raised.

In a further development, the microstructures are of annular shape. An annular shape means in particular that the inner and/or outer face of the optical body comprises grooves, whereby curved raised portions are formed in said face. The grooves may be provides horizontally or vertically on this face. If the optical body is compared with a terrestrial globe, the grooves may be provided along the lines of longitude or along the lines of latitude.

In the case of annular microstructures, the emission pattern is homogenized in the direction perpendicular to the tangent of the respective annular shape.

As an alternative to the annular shape, the microstructures may take the form of an array of individual lenses. For example, the outer face of the optical body is formed by a plurality of lens structures which are for example arranged in a matrix and immediately adjoin one another. In this case, the individual lenses likewise form the respective inner and/or outer face of the optical body.

The microstructures advantageously in each case have a curvature by means of which the emission pattern is homogenized.

In a further development, the microstructures at least in part have a different curvature. The microstructures are for example of annular shape, wherein the individual annular shapes differ with regard to the curvature thereof. The annular shapes here need not necessarily all have a different curvature, but may at least in part have the same curvature.

Alternatively, the microstructures may in each case have the same or identical curvature.

The respective shape of the microstructures and the respective curvature of the structures relative to one another depend on the desired beam shape and on the respective application of the optical element. In particular, the design of the microstructures depends on the radiation-emitting components to which the optical element is to be coupled and how these components are arranged.

In a further development, the microstructures are of spherical construction. In this case, the microstructures have a spherical shape. Alternatively, the microstructures may be of aspherical construction, i.e., have an optical shape which differs from the spherical. The respective development here again depends on the respective application of the optical element.

In a further development, the following apply to the optical element:

$$1/R_{optical\ body} \leq 1/(2*r_{microstructure}),\ \text{and}$$

$$0.01 \leq D_{microstructure}/(4*r_{microstructure}) \leq 0.5,$$

wherein $R_{optical\ body}$ is the radius of the half-shell of the optical body, $r_{microstructure}$ is in each case the curvature of the microstructures and $D_{microstructure}$ the width of microstructures or the clear aperture. The size of the geometry of the microstructures is here limited by the numerical aperture. The incident beam of light must not be too divergent in order to ensure the above-stated advantages. Using the above-stated dimensioning rules for the microstructures, it is possible to achieve optimum homogenization of the emission pattern.

In a further development, the microstructures form both the inner face and the outer face at least in places. This means that microstructures are arranged on both faces of the optical body. For example, annular microstructures are provided on the inner face and the outer face.

In a further development, the microstructures of the inner face have a curvature which differs from the microstructures of the outer face. The microstructures are, for example, annular in shape, wherein the curvatures on the inner and outer side of the half-shell differ. The orientation of the microstructures may here be identical or different on the inner and outer face.

In a further development, the microstructures of the inner and outer face are identically oriented and arranged directly opposite one another. The microstructures are, for example, annular in shape on both faces, wherein this annular formation of the inner and outer faces is congruently arranged, i.e., the curvature of the microstructures of the inner and outer face does not differ and the ring structures are identically oriented on the inner and outer face.

Alternatively, the inner and outer face microstructures may be arranged with a lateral offset in the polar direction.

The arrangement of the inner and outer face microstructures relative to one another here depends on the respective application of the optical element, the desired combination of the optical element with radiation-emitting semiconductor components and the arrangement thereof relative to one another.

In a further development, the inner and outer face microstructures have a curvature for which the following applies:

$$d_{max}/(2*r_{microstructure}) \leq 1.2,$$

wherein $d_{max}$ is the maximum height of the microstructures and $r_{microstructure}$ is the curvature of the microstructures. The curvature of microstructures is here selected such that a beam of light incident on the inner face of the optical element produces a focus which does not exceed a maximum distance $d_{max}$ from the outer face of the optical element.

In a further development, the microstructures on the inner face are rotated by 90° relative to the outer face microstructures. For example, the microstructures are in each case annular in shape, wherein for example the annular microstructures of the inner face take the form of lines of longitude and the annular microstructures of the outer face take the form of lines of latitude. In this manner, radiation can advantageously be mixed in all spatial directions, whereby a particularly homogeneous emission pattern of the optical element is obtained.

In a further development, the optical body takes the form of a hemispherical shell, cylindrical half-shell or toric half-shell. The configuration of the optical body here again depends on the application of the optical element in connection with the desired arrangement of radiation-emitting components.

In an embodiment, a radiation-emitting device comprises at least one radiation-emitting semiconductor component which comprises an active layer suitable for generation. The optical element is arranged downstream of the semiconductor component in the emission direction.

A device having such an optical element is distinguished in particular by a homogeneous emission pattern of the emitted radiation. This gives rise to very high emission efficiency, since substantially only Fresnel losses occur. At the same time, optimum mixing of the radiation emitted by the component is ensured, wherein shadows are not cast. The refractive microstructures may here be designed such that they assist in shaping the radiation emitted by the component.

The features mentioned in relation to the optical element also apply to the device and vice versa.

In a further development, the device comprises a plurality of semiconductor components which emit monochromatic light or light which is at least in part of different colors. The device comprises for example an array of monochromatic LEDs. The LEDs, for example, emit color in the white color coordinate range. Alternatively, the device may comprise an array of LEDs of at least two different colors, for example, the device comprises red and white LEDs.

The optical element of the device advantageously cancels out the spatial separation of the individual semiconductor components, whereby the emission pattern may advantageously be homogenized.

The semiconductor components are for example semiconductor chips which are suitable for generating radiation. The semiconductor chips are, for example, LEDs, preferably thin-film LEDs.

By purposeful selection of the semiconductor components, it is possible to produce a device which emits radiation from a specific color coordinate range, for example, a white-emitting device.

In a further development, a secondary optical system is arranged downstream of the optical element in the emission direction. The optical element is accordingly not entirely suitable for ensuring a desired beam shape. To this end, the secondary optical system is arranged downstream, which may advantageously, thanks to the homogenization of the radiation by the optical element, be achieved substantially more straightforwardly than in the absence of an optical element. The optical element is here arranged between the semiconductor component or semiconductor components and the secondary optical system.

The secondary optical system is, for example, a downstream lens or lens arrangement.

According to at least one embodiment, the optical element comprises a center point. For example, if the optical element is shaped as a spherical shell, the center point of the optical element is the center point of the associated sphere. Relative to the center point of the optical element, the individual microstructures on the outer face and/or on the inner face and along one spatial direction or along two spatial directions, which are then preferably orthogonal to one another, have, in a similar manner to spherical coordinates, an extent of 5° or of at least 8° or of at least 11°. The microstructures may have an extent of at most 20° or of at most 16° or of at most 14°.

According to at least one embodiment, the microstructures have an average extent along one or along two orthogonal spatial directions of at least 0.25 mm or of at least 0.75 mm. Alternatively or additionally, the average extent amounts to at most 5 mm or at most 2.5 mm.

BRIEF DESCRIPTION OF THE DRAWINGS

Further advantages and advantageous further developments of the invention are revealed by the exemplary embodiments described below in conjunction with FIGS. 1 to 6, in which:

FIGS. 1A, 2A, 3A, and 4A in each case show a schematic view of an exemplary embodiment of an optical element according to the invention;

FIGS. 1B, 3B and 4B in each case show schematic diagrams of the emission pattern of an optical element according to FIGS. 1A, 3A and 4A;

Figure 2B:
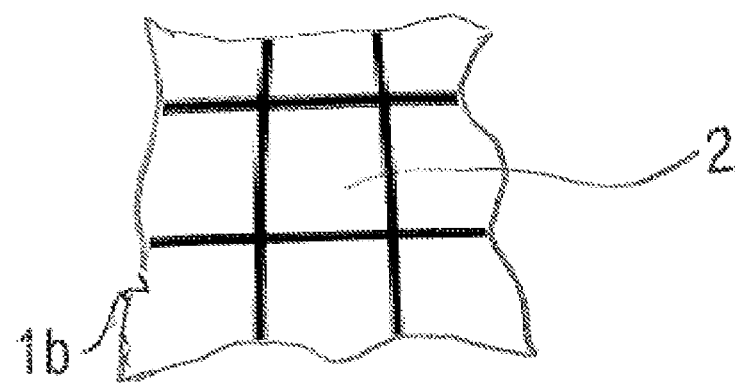
FIG. 2B shows a plan view onto the outer face.

In the figures, identical or identically acting components may in each case be provided with the same reference numerals. The components illustrated and their size ratios to one another should not be viewed as being to scale. Rather, individual elements such as, for example, layers, structures, components and regions are shown exaggeratedly thick or large for greater ease of depiction and/or better comprehension.

DETAILED DESCRIPTION OF ILLUSTRATIVE EMBODIMENTS

Figure 6A:
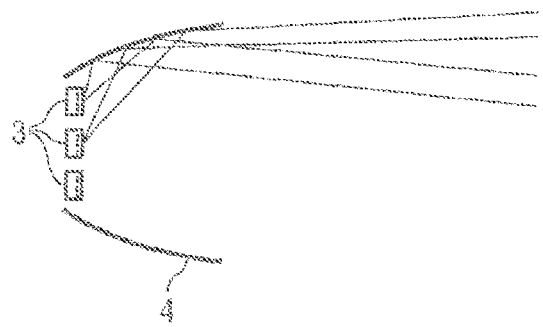
FIG. 6A shows a schematic cross-section of an exemplary embodiment of a conventional device.

FIG. 6A is a cross-section of a radiation-emitting device according to the prior art which comprises semiconductor components 3 which are arranged in a reflector 4. The semiconductor components 3 emit radiation when in operation, at least some of which is reflected on the reflector 4. Due to shading of the light emission at the opening of the reflector 4, shadows are here disadvantageously cast. Moreover, the beam of light may be split in accordance with the symmetry of the component arrangement.

It is known from the prior art to solve these problems by means of diffusers, which are, for example, arranged above the components (not shown). A disadvantage here, however, is that such arrangements cause major losses. It is alternatively known to improve the aperture of a secondary optical system downstream of the reflector by mounting three-dimensional structures, for example, teeth or films with transmission gradients (not shown). The high cost of mounting such teeth or films is, however, disadvantageous here.

Figure 6B:
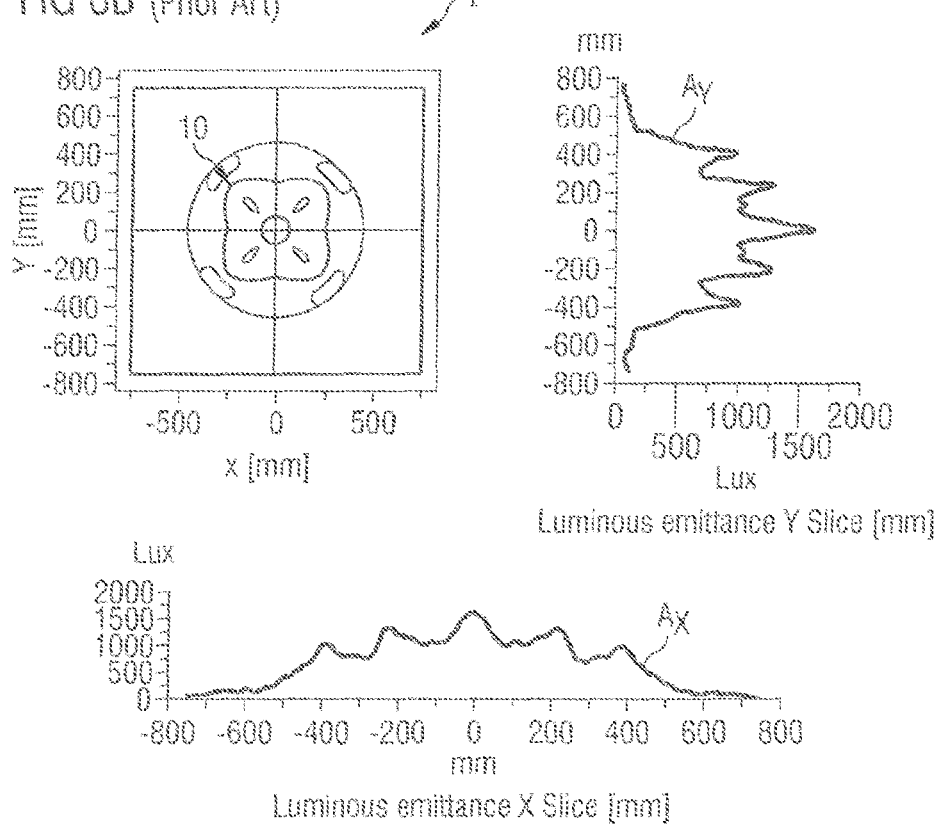
FIG. 6B shows diagrams of the emission pattern of the device according to the exemplary embodiment of FIG. 6A.

FIG. 6B shows three diagrams which illustrate the emission pattern of a device according to the exemplary embodiment of FIG. 6A. Diagram I shows the emission pattern, in particular the radiant intensity in plan view onto the device 10. The emission pattern here exhibits light intensity maxima which are shown lighter in the diagram. Adjacent to these light intensity maxima, a lower radiation efficiency is emitted by the device, such that the emission pattern overall provides a non-homogeneous appearance.

FIG. 6B shows further diagrams which illustrate a cross-section of the emission pattern. The measurement curve AY shows a cross-section of the emission pattern in the Y plane, while the measurement curve AX shows an emission pattern in the X plane. The emission pattern comprises not only intensity maxima but also adjacent intensity minima, such that overall a non-homogeneous emission pattern is produced.

According to the invention, in order to avoid this non-homogeneous emission pattern and achieve a homogeneous emission pattern, an optical element is arranged downstream of the semiconductor components. Said optical element is explained below in greater detail in connection with FIGS. 1 to 5.

FIG. 1A is a schematic view of an optical element 10 which comprises an optical body 1 and a plurality of microstructures 2. The optical body 1 comprises an inner face 1a and an outer face 1b and takes the form of a hemispherical shell. This means that the optical body 1 has the shape of a hollow hemisphere. In a radiation-emitting device according to the invention, said hemispherical shell is placed, for example, on a plurality of radiation-emitting semiconductor components, such that the latter are arranged in the interior of the hemispherical shell and emit radiation in the direction of the inner face 1a.

The microstructures 2 of the optical element 10 are arranged on the outer face 1b of the optical body 1. In particular, the microstructures 2 at least in places form the outer face 1b. This means that the microstructures 2 and the optical body 1 are of one-piece construction. The optical element 10 is, for example, injection-molded.

In the exemplary embodiment of FIG. 1A, the microstructures 2 are annular in shape, i.e., are ring shaped. This means that radially extending grooves are arranged on the outer face of the optical element 10. The microstructures 2 here form round raised portions on the outer face 1b, which raised portions are defined by in each case two grooves.

The optical body 1 exhibits symmetry to an axis of symmetry which passes through a central point of the optical element. The microstructures are here of annular construction about the axis of symmetry. The annular shape of the microstructures 2 here becomes smaller towards the central point, i.e., towards the axis of symmetry. In particular, the diameter and the width of the annular shape becomes smaller towards the central point.

The microstructures 2 on the outer side have an annular shape with a curvature. The individual annular shapes of the microstructures may here have an identical curvature or a different curvature. The curvature homogenizes the radiation.

In the exemplary embodiment of FIG. 1, the inner face 1a is planar, i.e., has no microstructures. The inner face 1a thus takes the form of an unstructured hemispherical layer.

The optical element 10 advantageously makes it possible to produce light scattering as a result of the microstructures 2, which do not operate by means of roughness or in the manner of diffusers. In particular, the microstructures 2 are light-scattering refractive structures. Accordingly, if semiconductor components are arranged upstream of the optical element 10, the optical element provides a homogeneous emission pattern with very high efficiency, since, advantageously, substantially only Fresnel losses occur. At the same time, the problem of mixing of the radiation emitted by the components and of shadows being cast is advantageously solved.

FIG. 1B shows the emission pattern of a device which comprises semiconductor components and the optical element according to the exemplary embodiment of FIG. 1A as the downstream element. The semiconductor components are arranged in a 3×3 array upstream of the optical element. The semiconductor components are, for example, white LEDs. The device is arranged in a simple focusing reflector. In other words, the LEDs and the optical element are fastened to a bottom face of the reflector.

Diagram I of FIG. 1B shows the radiant intensity in plan view onto the optical element. Only in the central point, through which the axis of symmetry of the optical element passes, is increased light intensity to be observed. Regions adjacent to the axis of symmetry exhibit a similar light intensity, such that a substantially homogeneous emission pattern is produced by the optical element 10.

FIG. 1B likewise shows measurement curves AY, AX which show a cross-section of the emission pattern in the X and Y plane through the axis of symmetry. These measurement curves AX, AY demonstrate the substantially uniform emission efficiency with a maximum in the central point.

The exemplary embodiment of FIG. 2A shows a plan view of an optical element according to the invention which, in contrast with the exemplary embodiment shown in FIG. 1A, does not comprise any microstructures as an annular shape. In the optical element 10 of FIG. 2A, an array of individual lenses is provided on the outer face 1b of the optical body 1. The optical body 1 and the microstructures 2, thus the individual lenses, are here again of one-piece construction. The individual lenses are arranged on the outer face 1b in the manner of a matrix. This matrix-like arrangement may, for example, be rotationally symmetrical to the axis of symmetry of the optical element 10, wherein the size of the lenses decreases towards the axis of symmetry. The individual lenses, on the other hand, may be of non-rotationally symmetrical construction. Optimum radiation homogenization is achieved, for example, by intersecting individual lenses, for example, cylindrical lenses, i.e., homogenization is based on a breaking the rotational symmetry.

The exemplary embodiment of FIG. 2A otherwise substantially corresponds to the exemplary embodiment of FIG. 1A.

According to FIG. 2A, the microstructures 2, when viewed in plan view onto the outer face 1b, have a trapezoidal base area as shown in FIG. 2B and, at the point of intersection with the optical axis, preferably a triangular base area. The base area of the microstructures 2 declines continuously towards the point of intersection. The microstructures 2 are formed by grooves along lines of latitude and by degrees of longitude of the hemispherical shell-shaped outer face 1b.

Figure 3A:
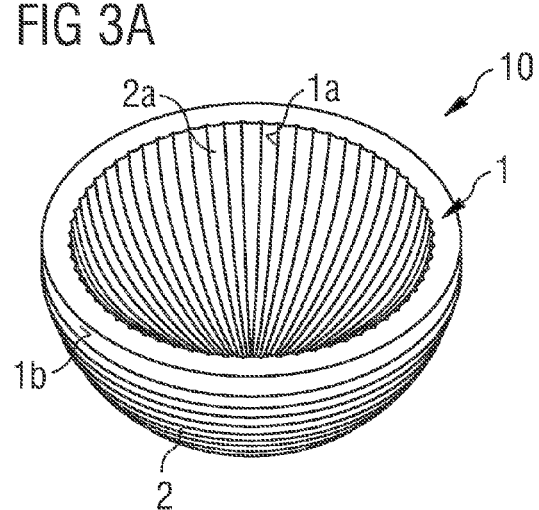

FIG. 3A shows a further exemplary embodiment of an optical element 10, wherein, in contrast with the exemplary embodiment shown in FIG. 1A, the inner face 1a of the optical body 1 likewise comprises microstructuring 2a. The development of the outer face 1b of the optical body 1 substantially corresponds to the development of the optical element of the exemplary embodiment of FIG. 1A.

The microstructures 2a of the inner face 1a are likewise annular in shape, wherein said annular configuration is rotated by 90° relative to the annular shape of the microstructures 2 of the outer face 1b. The annular microstructures 2a of the inner face 1a are thus directed along the axis of symmetry. If the optical element 10 of FIG. 3A is compared for example with half a hollow terrestrial globe, the annular microstructures 2 of the outer face take the form of lines of latitude and the microstructures 2a of the inner face 1a take the form of lines of longitude.

The inner face 1a, like the outer face 1b, accordingly likewise comprises grooves which are connected by rounded portions. The rounded portions here in each case have a curvature which varies or is identical in degree. It is also possible for the curvature of the microstructures of the outer face 1b to differ from the curvature of the microstructures 2a of the inner face 1a.

A combination of microstructures rotated by 90° on the inner and outer face ensures light mixing in all spatial directions, such that in combination with semiconductor components said optical element 10 advantageously ensures optimum mixing of the radiation emitted by the plurality of components.

According to FIG. 3A, the microstructures 2a on the inner face 1a are thus arranged rotated by 90° relative to the microstructures 2 of the outer face 1b, with regard to the main directions of extension of the microstructures 2a, 2. The microstructures 2 on the outer face 1b extend along lines of latitude of the hemispherical optical element 10, thus in each case perpendicular to an optical axis. The microstructures 2a on the inner side 1a extend along degrees of longitude, i.e., parallel to the optical axis when seen in side view. Furthermore the microstructures 2a converge to a point of intersection of the optical axis with the inner face 1a.

The microstructures 2, 2a may also be oriented exactly the other way round to that shown in FIG. 3A, i.e., the inner microstructures 2a then extend along lines of latitude and the outer microstructures 2 along degrees of longitude.

Figure 3B:
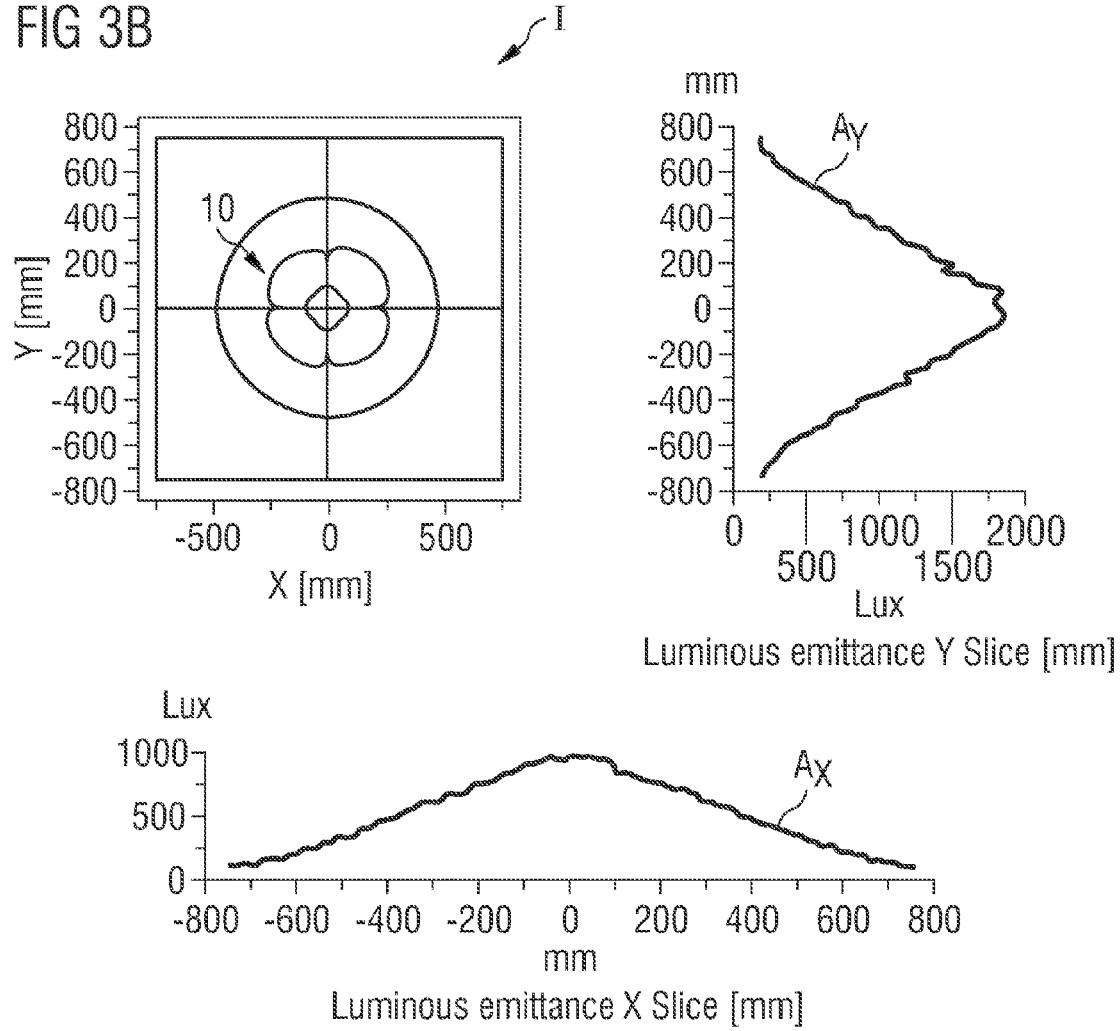

FIG. 3B shows diagrams regarding radiant intensity across the emission angle. Diagram I shows a plan view of the emission intensity of the optical element 10 of FIG. 3A. As is indicated, such a device exhibits higher light emission in the middle zone than in the outer zone. This is also confirmed by the measurement curves AX and AY, which show a cross-section through the emission profile in the X and Y plane through the central point. The emission profile accordingly approximately follows a Gaussian beam profile, which is advantageous for many applications.

The emission profile advantageously does not have a plurality of intensity maxima, which are delimited by a plurality of intensity minima, but instead a uniform illumination with merely a central maximum is provided.

Figure 4A:
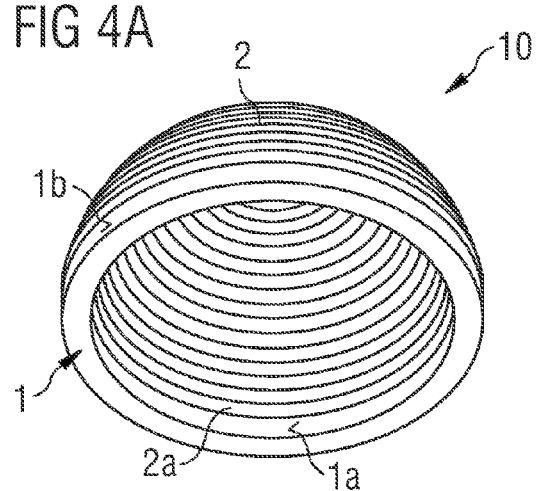

In the exemplary embodiment of FIG. 4A, in comparison with the exemplary embodiment of FIG. 3A, the microstructuring 2a of the inner face 1a is oriented identically to the microstructuring 2 of the outer face 1b. In this case, the microstructuring 2a of the inner face 1a thus likewise follows the lines of latitude. The microstructures 2 of the outer face 1b are here arranged directly opposite the microstructures 2a of the inner face 1a. Alternatively, the microstructures 2, 2a may be arranged with a lateral offset in the polar direction relative to one another (not shown).

The exemplary embodiment of FIG. 4A otherwise substantially corresponds to the exemplary embodiment of FIG. 3A.

Figure 4B:
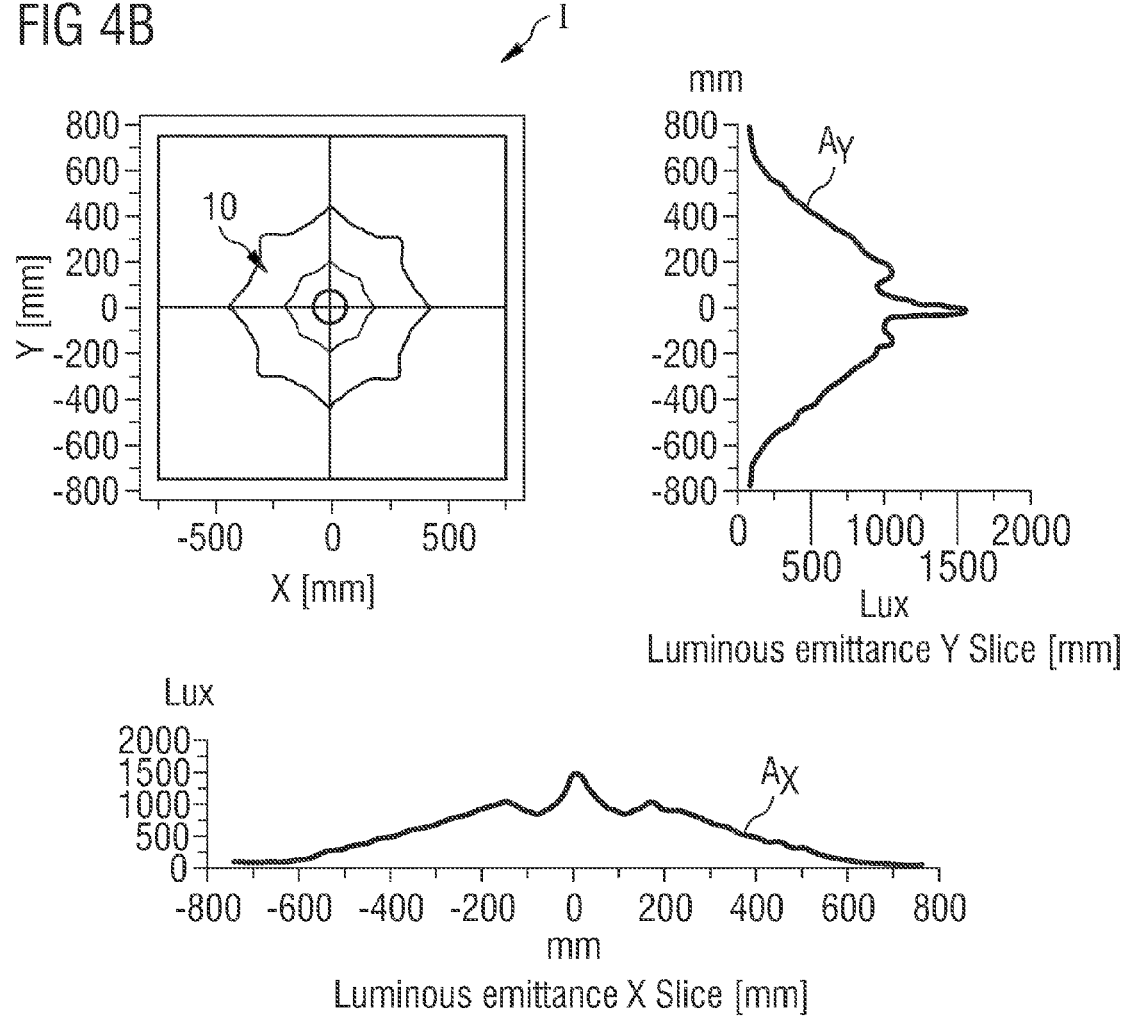

FIG. 4B shows the emission profile of a device having the optical element according to the exemplary embodiment of FIG. 4A. Diagram I shows a plan view of the emission profile of the optical element 10, wherein elevated radiation emission is only measured in the central point. Regions adjacent to the central point exhibit a uniform emission pattern. This is made clear in the measurement curves AX, AY, which have a uniform emission pattern, wherein there is a light emission maximum in the central point.

Depending on the desired application and accordingly the desired emission profile, it is possible to provide a device which comprises radiation-emitting semiconductor components and an optical element according to the exemplary embodiments of FIG. 1A, 2, 3A or 4A. The optical bodies 10 are here not necessarily restricted to a hemispherical shell. The optical bodies may alternatively take the form of a cylindrical half-shell or toric half-shell (not shown).

Figure 5A:
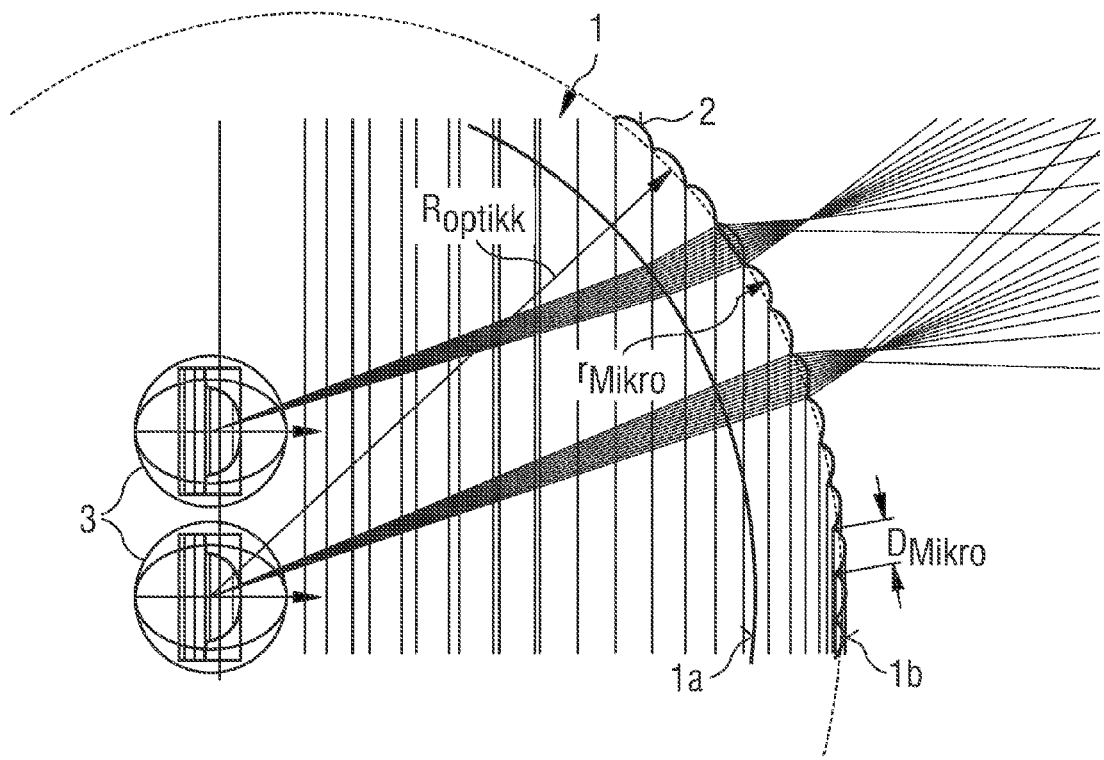
FIGS. 5A and 5B in each case show a schematic cross-section through an exemplary embodiment of a radiation-emitting device according to the invention.
Figure 5B:
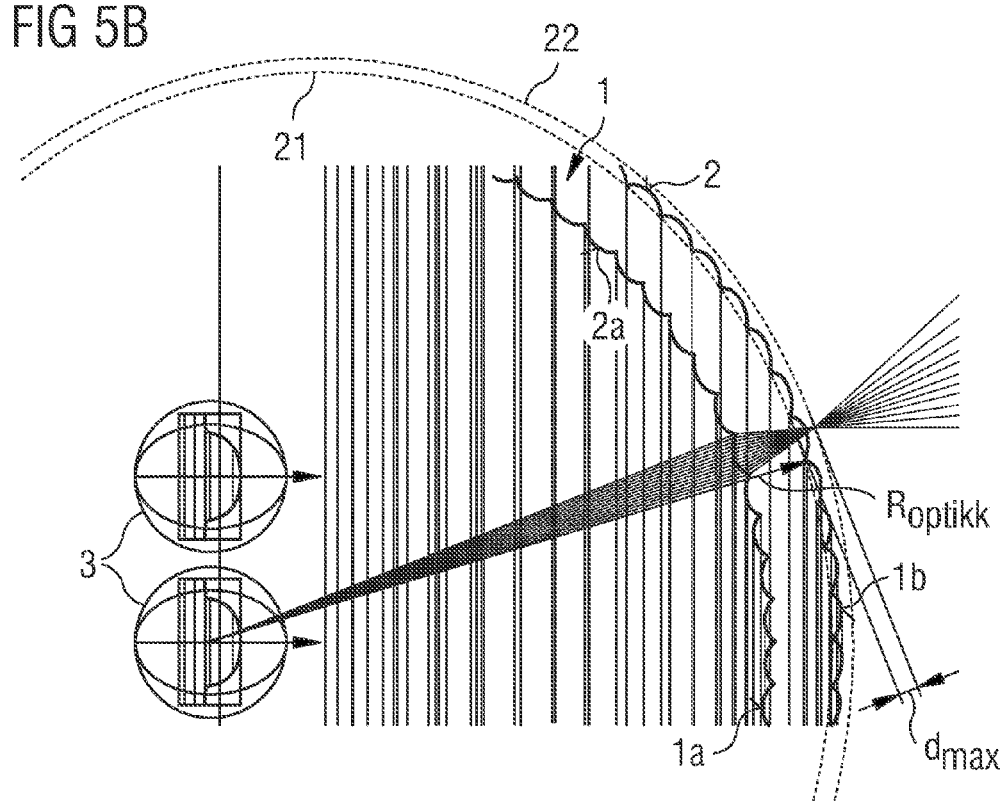

FIGS. 5A and 5B show partial cross-sections through a radiation-emitting device which comprises radiation-emitting semiconductor components 3 and an optical element arranged downstream in the emission direction. The radiation-emitting components may be oriented such that they emit monochromatic light or light of different colors. A secondary optical system may in each case be arranged downstream of the device. Such a secondary optical system may assist in shaping the emitted beam of light in accordance with a desired emission pattern.

The exemplary embodiment of FIG. 5A makes use of an optical element according to the exemplary embodiment of FIG. 1A. The optical body 1 has a smooth inner face 1a. On the outer face 1b are provided microstructures 2 which extend as an annular shape in the radial direction. The microstructures 2 here have a curvature $r_{micro}$ and a width or clear aperture $D_{micro}$. The microstructures 2 of the optical body 1 are arranged at a distance $R_{optical\ body}$ from the LEDs.

The semiconductor components 3 emit beams of light which are shaped on the microstructuring 2. The following conditions must be met to prevent the incident beam of light from being made too divergent by the microstructures:

$$1/R_{optical\ body} \leq 1/(2*r_{micro}),\ \text{and}$$

$$0.01 \leq D_{micro}/(4*r_{micro}) \leq 0.5.$$

Under such conditions, an optical element is provided which has the least possible Fresnel losses, whereby a homogeneous emission pattern is achieved.

The exemplary embodiment of FIG. 5B differs from the exemplary embodiment of FIG. 5A in that use is made of an optical element according to the exemplary embodiment of FIG. 4A, which thus has identically oriented microstructures 2 on the inner face 1a of the optical body 1.

The curvature of the microstructures 2, 2a on the inner and outer face is here selected such that an incident beam of light emitted by the components produces a focus which does not exceed a maximum distance $d_{max}$ from the outer face of the optical body. The following must apply for this purpose:

$$d_{max}/(2*r_{micro}) \leq 1.2.$$

The distance $d_{max}$ is here measured at a radius 22 which is obtained by connecting the highest points of the microstructures 2 of the outer face 1b and a radius 21 which is obtained by connecting the lowest points of the microstructures 2 of the outer face 1b, i.e., the grooves.

A 3×3 array of white LEDs is in each case used in FIGS. 1B, 3B and 4B. The LEDs may alternatively emit light of different colors. For example, such a device comprises 3×3 array with five white and four red LEDs.

The invention is not limited to the exemplary embodiments as a result of the description made with reference thereto, but instead the invention encompasses any novel feature and any combination of features, including in particular any combination of features in the claims, even if these features or these combinations are not themselves explicitly indicated in the claims or exemplary embodiments.

The invention claimed is:

1. An optical element comprising:
   an optical body forming a half-shell and comprising an inner face and an outer face; and
   a plurality of microstructures forming the outer face of the optical body, the inner face being free of microstructures,
   wherein the microstructures are light-scattering refractive structures,
   wherein the microstructures form an array of individual lenses and the microstructures, when viewed in plan view onto the outer face, have a base area, the base area of the microstructures declines continuously towards a point of intersection of an optical axis with the outer face,
   wherein the microstructures are formed by continuous grooves along continuous lines of latitude and by continuous degrees of longitude of the hemispherical shell-shaped outer face, and
   wherein the continuous grooves along the continuous lines of latitude are continuous for 360 degrees around the optical axis.

2. The optical element according to claim 1, wherein the microstructures at least in part have different shapes.

3. The optical element according to claim 1, wherein the microstructures are aspherical.

4. The optical element according to claim 1, wherein the optical body forms a hemispherical shell.

5. A radiation-emitting device comprising:
   a radiation-emitting semiconductor component comprising an active layer configured to generate radiation; and
   an optical element according to claim 1 arranged downstream of the semiconductor component in an emission direction.

6. The radiation-emitting device according to claim 5, wherein the device comprises a plurality of semiconductor components that emit monochromatic light.

7. The radiation-emitting device according to claim 5, wherein the device comprises a plurality of semiconductor components that emit light which is at least in part of different colors.

8. An optical element comprising:
   an optical body forming a half-shell and comprising an inner face and an outer face; and
   a plurality of microstructures that form the inner and outer face of the optical body,
   wherein the microstructures are light-scattering refractive structures,
   wherein the microstructures of the outer face have annular shape about an axis of symmetry of the optical body, the annular shape of the microstructures becoming smaller towards the axis of symmetry, wherein the microstructures of the inner face have annular configuration, the annular configuration being rotated by 90° relative to the annular shape of the microstructures of the outer face so that the microstructures of the inner face are directed along the axis of symmetry, wherein the microstructures of the outer face form lines of latitude and the microstructures of the inner face form lines of longitude, wherein an emission profile of the optical element follows a Gaussian beam profile, wherein the emission profile does not have a plurality of intensity maxima delimited by a plurality of intensity minima, and wherein the emission profile comprises a uniform profile with just one central maximum.

9. The optical element according to claim 1, wherein the microstructures shape a radiation only by refraction so that the microstructures are light-scattering refractive structures, wherein the individual lenses are arranged as an array in a manner of a matrix on the outer face of the optical body, and wherein the optical body and the individual lenses are of one-piece construction.

10. The optical element according to claim 1, wherein the base area is a trapezoidal base area.

11. A radiation emitting device comprising:
an array of red and white emitting LEDs; and
an optical element, the optical element comprising:
  an optical body forming a hemispherical half-shell and comprising an inner face and an outer face; and
  a plurality of microstructures that form the inner and outer face of the optical body,
  wherein the microstructures are light-scattering refractive structures,
  wherein the microstructures of the outer face have annular shape about an axis of symmetry of the optical body, the annular shape of the microstructures becoming smaller towards the axis of symmetry,
  wherein the microstructures of the inner face have annular configuration, the annular configuration being rotated by 90° relative to the annular shape of the microstructures of the outer face so that the microstructures of the inner face are directed along the axis of symmetry, and
  wherein the microstructures of the outer face form lines of latitude and the microstructures of the inner face form lines of longitude,
  wherein the inner and outer face microstructures have a curvature for which the following applies:

$$d_{max}/(2*r_{microstructure}) \leq 1.2,$$

wherein $d_{max}$ is the maximum height of the microstructures and $r_{microstructure}$ is the curvature of the microstructures seen in a cross-section perpendicular with the respective annular shape,
  wherein the microstructures shape the radiation by refraction only so that the microstructures are light-scattering refractive structures,
  wherein a center point of the red and white emitting LESs is a center point of the optical hemispherical half-shell, and
  wherein the individual microstructures on the outer face and on the inner face along a spatial direction in each case have an extent of at least 5° and at most 14°.

12. The radiation emitting device according to claim 11, wherein an emission profile of the optical element follows a Gaussian beam profile, wherein the emission profile does not have a plurality of intensity maxima delimited by a plurality of intensity minima, and wherein the emission profile comprises a uniform profile with just one central maximum.

* * * * *